(12) United States Patent
Kim

(10) Patent No.: US 7,766,535 B2
(45) Date of Patent: Aug. 3, 2010

(54) PANEL GUIDE MEMBER AND DISPLAY DEVICE HAVING THE SAME

(75) Inventor: Do Sung Kim, Gumi-si (KR)

(73) Assignee: LG. Display Co., Ltd., Seoul (KR)

( * ) Notice: Subject to any disclaimer, the term of this patent is extended or adjusted under 35 U.S.C. 154(b) by 97 days.

(21) Appl. No.: 11/961,595

(22) Filed: Dec. 20, 2007

(65) Prior Publication Data
US 2008/0151579 A1 Jun. 26, 2008

(30) Foreign Application Priority Data
Dec. 21, 2006 (KR) ...................... 10-2006-0131731

(51) Int. Cl.
*F21V 7/04* (2006.01)
(52) U.S. Cl. ...................... 362/633; 362/634
(58) Field of Classification Search .................. 362/362, 362/632, 633, 634; 349/58, 60, 65
See application file for complete search history.

(56) References Cited
U.S. PATENT DOCUMENTS 6,055,029 A * 4/2000 Kurihara et al. ............. 362/633
6,452,649 B1 * 9/2002 Ono et al. ...................... 349/60
7,224,416 B2 * 5/2007 Cha et al. ...................... 349/60
2002/0030771 A1 * 3/2002 Kim ............................. 349/60

FOREIGN PATENT DOCUMENTS

KR 2004053427 A * 6/2004

* cited by examiner

*Primary Examiner*—Y My Quach Lee
(74) *Attorney, Agent, or Firm*—Brinks Hofer Gilson & Lione

(57) ABSTRACT

Provided are a panel guide member and a display device having the same. The display device includes a receiving container, a light source, a display panel, a pane guide member, and a top case. The receiving container includes a bottom plate and sidewalls protruding from edges of the bottom plate. The light source is disposed in the receiving container to generate light. The display panel faces the bottom plate and displays an image using the light. The panel guide member includes a plurality of panel guide bodies dividing and supporting an NEDR around an EDR of the display panel on which an image is displayed, and warp preventing members connecting the panel guide bodies with each other and suppressing warping of the panel guide bodies caused by contraction/expansion of the panel guide bodies. The top case includes a first cover, and a second cover to couple to the sidewalls.

13 Claims, 5 Drawing Sheets

PANEL GUIDE MEMBER AND DISPLAY DEVICE HAVING THE SAME

CLAIM FOR PRIORITY

The present application claims priority under 35 U.S.C. 119 and 35 U.S.C. 365 to Korean Patent Application No. 10-2006-0131731 (filed on Dec. 21, 2006), which is hereby incorporated by reference in its entirety.

BACKGROUND

The present disclosure relates to a panel guide member and a display device having the same.

Recently, an information processing apparatus that can process a large capacity of data in ultra high speed, and a display device that can display data processed by the information processing apparatus in the form of an image are under development.

Generally, display devices are generally categorized into analog display device and digital display devices. Examples of an analog display device include cathode ray tubes (CRTs). Examples of a digital display device include liquid crystal display (LCD) devices, organic light emitting diodes (OLEDs), and plasma display panels (PDPs).

The LCD device display an image using liquid crystal (LC) having an electrical characteristic that the arrangement of the LC changes in response to an electric field and whose light transmittance changes in response to the arrangement of the LC. The OLED displays an image using an organic light emitting material for generating light using a forward current. The PDP display an image using plasma.

The LCD device displaying an image using LC includes a display panel including electrodes for controlling the LC, a backlight assembly for providing light to the display panel, and a panel guide member for solidly supporting the display panel to the backlight assembly.

The panel guide member supports an edge of the display panel, and opens a portion of the display panel where an image is displayed. The related art panel guide member is primarily manufactured by injecting a synthetic resin.

The panel guide member manufactured using a synthetic resin is warped as it expands due to heat generated from the backlight assembly in a limited space.

In the container where warping is generated to the panel guide member, light leaks to a separated space between the panel guide member and the display panel, so that display quality of an image remarkably reduces.

SUMMARY

Accordingly, the present invention is directed to a liquid crystal display device that substantially obviates one or more of the problems due to limitations and disadvantages of the related art.

Embodiments provide a panel guide member that suppresses warp generation caused by heat.

Embodiments also provide a display device including a panel guide member.

In one embodiment, a panel guide member includes: a plurality of panel guide bodies dividing and supporting a non-effective display region around an effective display region of a display panel on which an image is displayed; and warp preventing members connecting the panel guide bodies with each other and suppressing warping of the panel guide bodies caused by contraction/expansion of the panel guide bodies.

In another embodiment, a display device includes: a receiving container including a bottom plate and sidewalls protruding from edges of the bottom plate; a light source in the receiving container, the light source generating light; a display panel facing the bottom plate and displaying an image using the light; a panel guide member including a plurality of panel guide bodies dividing and supporting a non-effective display region around an effective display region of the display panel on which an image is displayed, and warp preventing members connecting the panel guide bodies with each other and suppressing warping of the panel guide bodies caused by contraction/expansion of the panel guide bodies; and a top case including a first cover covering an edge of the display panel, and a second cover extending from the first cover along the sidewalls to couple to the sidewalls.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention, in which.

DETAILED DESCRIPTION OF THE PREFERRED EMBODIMENTS

Reference will now be made in detail to the embodiments of the present disclosure, examples of which are illustrated in the accompanying drawings.

Panel Guide Member

Figure 1:
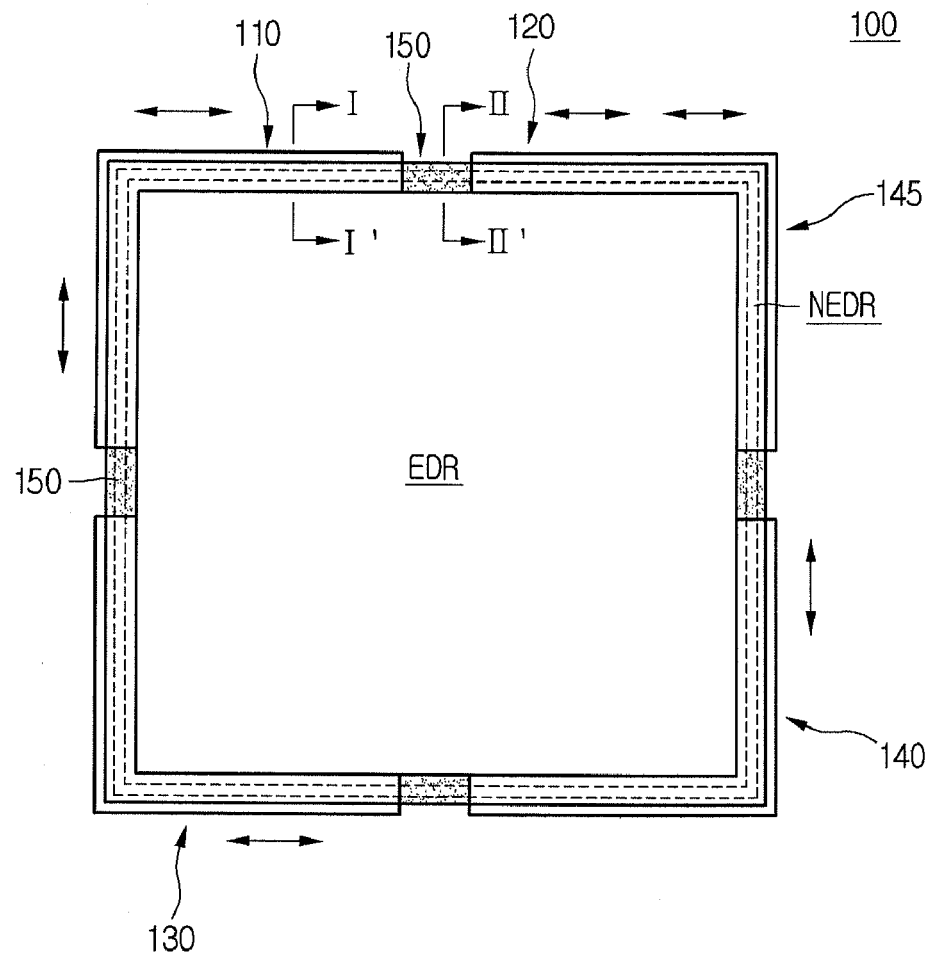
FIG. 1 is a plan view illustrating a panel guide member according to an embodiment.
Figure 2:
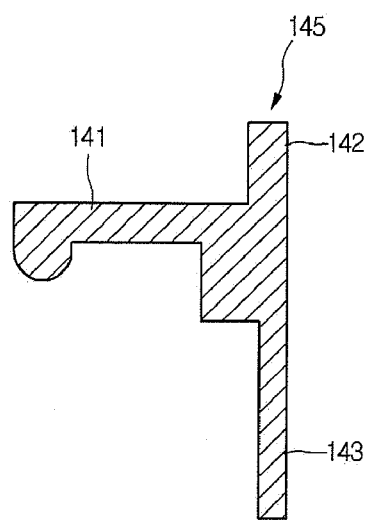
FIG. 2 is a cross-sectional view taken along the line I-I' of FIG. 1.
Figure 3:
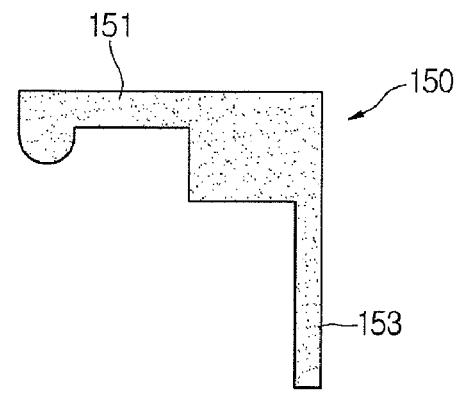
FIG. 3 is a cross-sectional view taken along the line II-II' of FIG. 1.

FIG. 1 is a plan view illustrating a panel guide member according to an embodiment, FIG. 2 is a cross-sectional view taken along the line I-I' of FIG. 1, and FIG. 3 is a cross-sectional view taken along the line II-II' of FIG. 1.

Referring to FIG. 1, the panel guide member 100 supports a non-effective display region (NEDR) disposed around an effective display region (EDR) of a display panel having a quadrangular plate shape and displaying an image.

In detail, the panel guide member 100 includes a plurality of panel guide bodies 145 and a plurality of warp preventing members 150.

In the embodiment, the plurality of panel guide members 145 divide and support the NEDR of the display panel.

The panel guide bodies 145 can include at least two parts. In the embodiment, the panel guide bodies 145 include four parts, for example. Hereinafter, reference numerals 110, 120, 130, and 140 are given to the four panel guide bodies 145, respectively.

The four panel guide bodies 145 are disposed to four edges of the display panel having the quadrangular shape, respectively. The panel guide bodies 145 have a perpendicularly bent bracket shape, for example, to support the four edges of the display panel.

Referring to FIG. 2, each panel guide body 145 includes a first support 141 for supporting the display panel, a second support 142 for supporting the lateral side of the display panel, and a third support 143 for fixing the panel guide body 145 in a receiving container which will be described later.

The panel guide bodies 145 including the four parts include a synthetic resin. Also, since each panel guide body 145 is manufactured using an injection manner, it expands when heated and contracts when cooled.

The warp preventing members 150 prevent generation of warp caused by expansion or contraction of the panel guide bodies 145 including the plurality of parts, and mechanically connects the panel guide bodies 145 including the plurality of parts.

In the embodiment, the warp preventing members 150 include an elastic member including an elastic material to prevent warping of the panel guide bodies 145 and connect the panel guide bodies 145.

The warp preventing member 150 is interposed between the ends of adjacent panel guide bodies 145, and coupled to the panel guide body 145. In the embodiment, an adhesive member can be interposed between the warp preventing member 150 and the panel guide body 145. The adhesive member can be a double-sided adhesive tape or an adhesive. Alternatively, the warp preventing member 150 and the panel guide body 145 can be integrally formed.

Referring to FIG. 3, the warp preventing member 150 includes a first warp prevention support 151 and a second warp prevention support 153 for fixing the panel guide body 145 to the receiving container. In addition, the warp preventing member 150 can further include, though not shown, a side warp prevention support for supporting the lateral side of the display panel.

Figure 4:
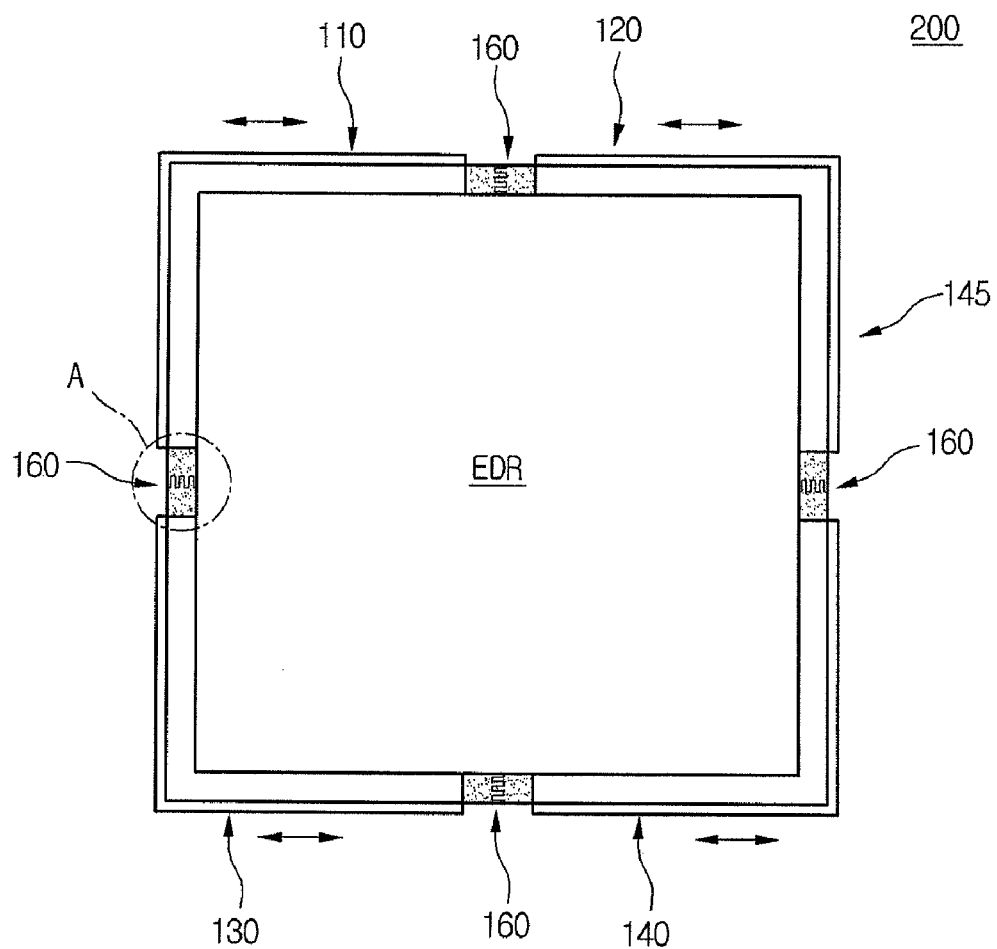
FIG. 4 is a plan view illustrating a panel guide member according to another embodiment.
Figure 5:
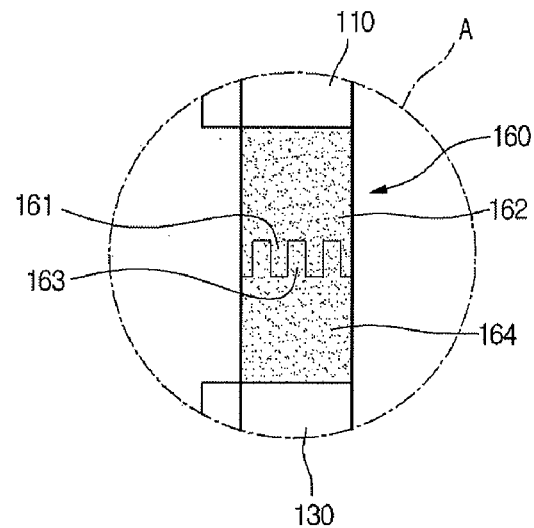
FIG. 5 is a partial enlarged view illustrating the portion A of FIG. 4.

FIG. 4 is a plan view illustrating a panel guide member according to another embodiment, and FIG. 5 is a partial enlarged view illustrating the portion A of FIG. 4. The panel guide member according to the other embodiment is substantially the same as the panel guide member of FIG. 1 except the warp preventing member 150. Therefore, the same reference numerals and names are used for the same elements.

Referring to FIGS. 4 and 5, the panel guide member 200 includes panel guide bodies 145 (110, 120, 130, and 140), and warp preventing members 160.

The warp preventing members 160 of the panel guide member 200 are disposed to the ends of the panel guide bodies 145 (110, 120, 130, and 140), respectively. In the embodiment, the warp preventing member 160 includes a first elastic member 162 having a first coupling portion 161, and a second elastic member 164 having a second coupling portion 163 coupled to the first coupling portion 161.

The first coupling portion 161 of the first elastic member 162 can be a coupling protrusion, for example, and the second coupling portion 163 of the second elastic member 164 can be a coupling groove coupled to the coupling protrusion. Alternatively, the first coupling portion 161 of the first elastic member 162 can be a coupling groove, and the second coupling portion 163 of the second elastic member 164 can be a coupling protrusion.

The first coupling portion 161 of the first elastic member 162, and the second coupling portion 163 of the second elastic member 164 are coupled to each other in a mutual fitting manner.

In the embodiment, the first coupling portion 161 of the first elastic member 162 can have a saw tooth shape, and the second coupling portion 163 of the second elastic member 164 can have a saw tooth shape engaged with the first coupling portion 161 having the saw tooth shape.

Figure 6:
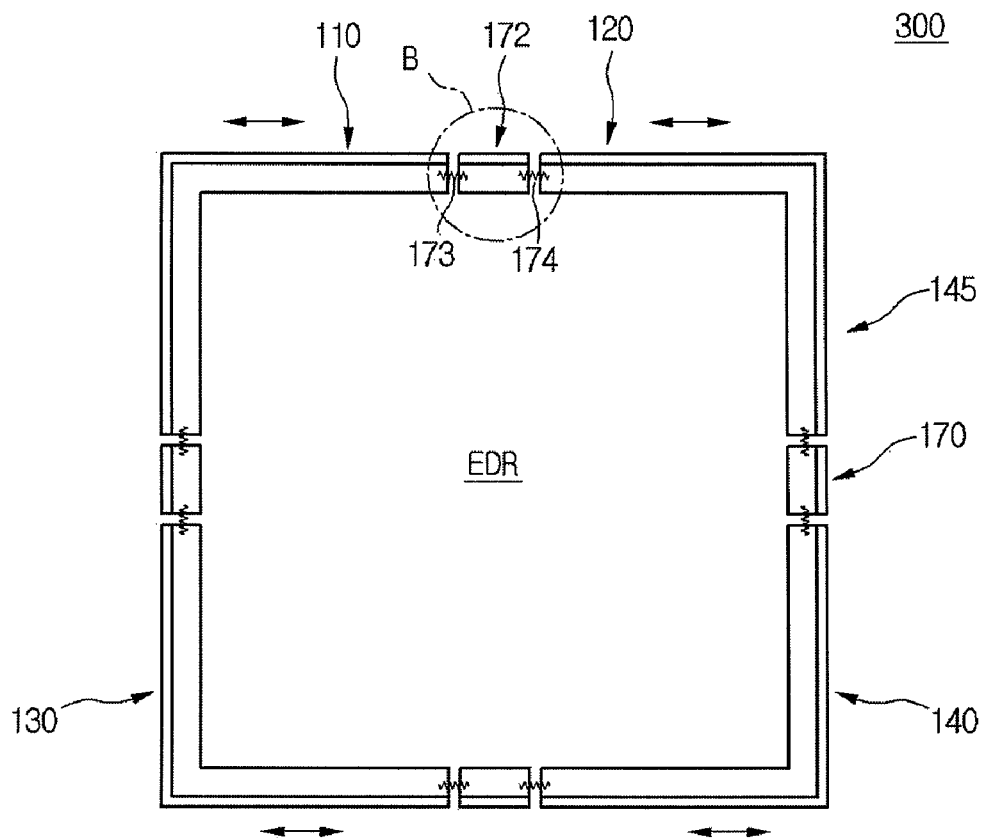
FIG. 6 is a plan view illustrating a panel guide member according to still another embodiment.
Figure 7:
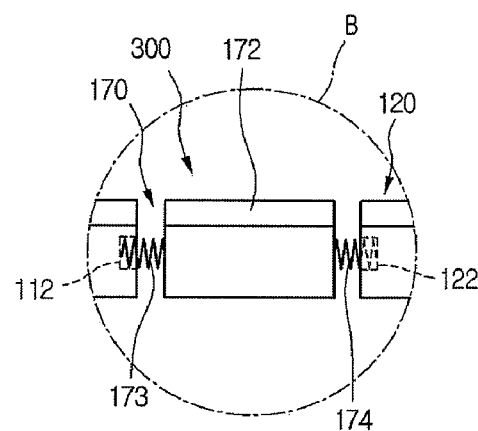
FIG. 7 is an partial enlarged view illustrating the portion B of FIG. 6.

FIG. 6 is a plan view illustrating a panel guide member according to still another embodiment, and FIG. 7 is an partial enlarged view illustrating the portion B of FIG. 6.

The panel guide member according to the still another embodiment is substantially the same as the panel guide member of FIG. 1 except the warp preventing member 130. Therefore, the same reference numerals and names are used for the same elements.

Referring to FIGS. 6 and 7, the panel guide member 300 includes panel guide bodies 145 (110, 120, 130, and 140), and warp preventing members 160.

The warp preventing member 170 includes a body 172, a first elastic member 173, and a second elastic member 174.

The body 172 is interposed between two adjacent panel guide bodies 145. In the embodiment, the cross-section of the body 172 can have substantially the same shape as that of the panel guide body 145 illustrated in FIG. 2.

One side of the first elastic member 173 is interposed between the panel guide body 110 on one side and the body 172. In the embodiment, the first elastic member 173 can be a spring. The one end of the first elastic member 173 is fixed inside a recess 122 formed in the end of the panel guide body 110 on one side, and the other end of the first elastic member 173 is fixed at the body 172.

The second elastic member 174 is interposed between the panel guide body 120 on the other side facing the panel guide body 110 on one side, and the body 172. In the embodiment, the second elastic member 174 can be a spring, and the one end of the second elastic member 174 is fixed inside a recess 122 formed in the end of the panel guide body 110 on the other side, and the other end of the first elastic member 174 is fixed at the body 172.

Display Device

Figure 8:
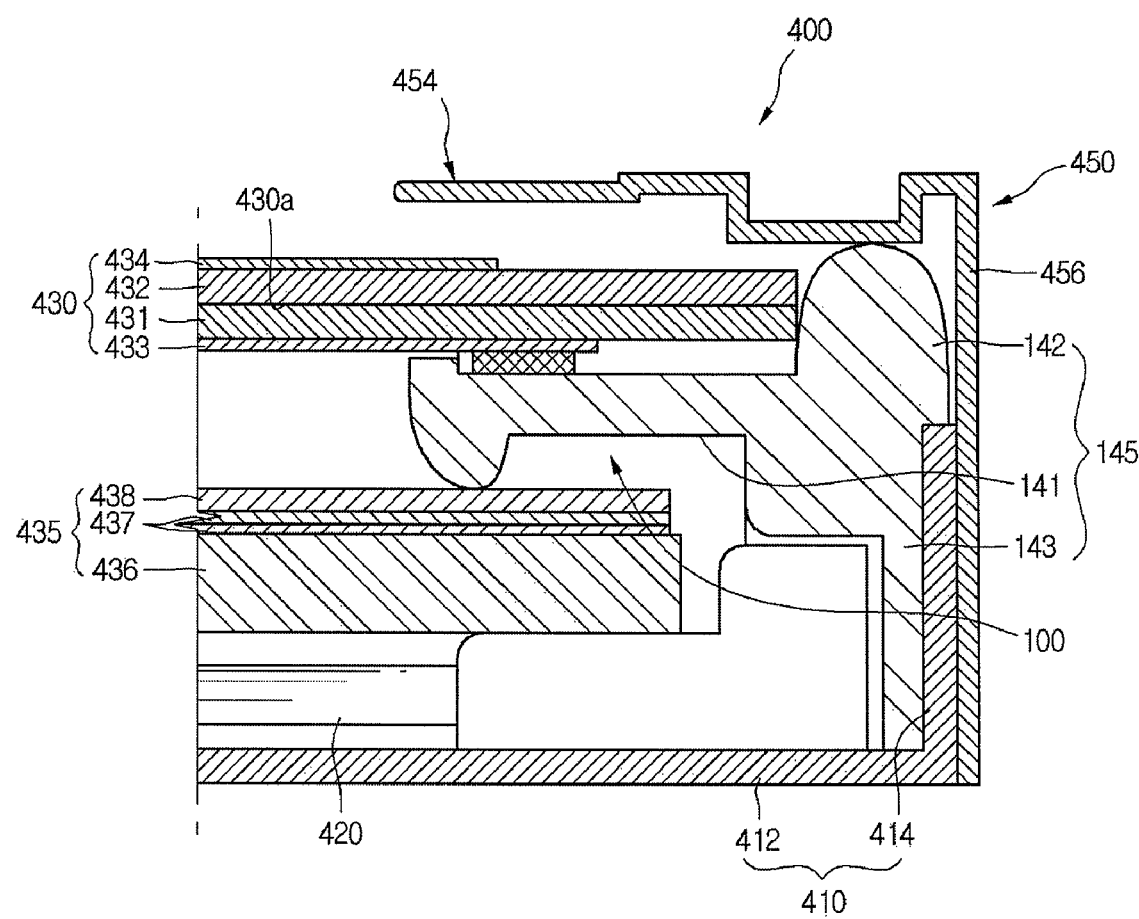
FIG. 8 is a cross-sectional view of a display device in which a panel guide body of a panel guide member is cut according to an embodiment.
Figure 9:
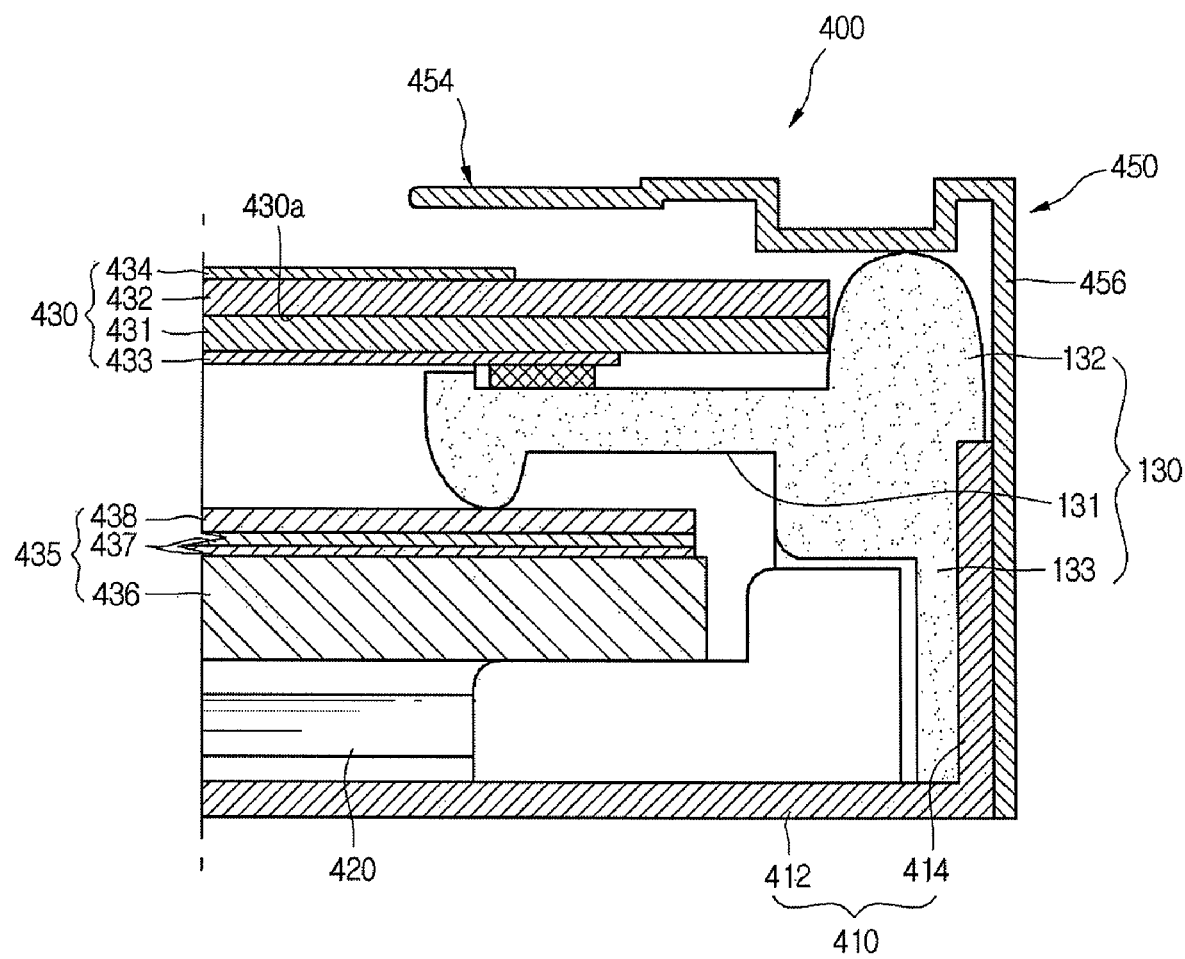
FIG. 9 is a cross-sectional view of a display device in which a warp preventing member of a panel guide member is cut according to an embodiment.

FIG. 8 is a cross-sectional view of a display device in which a panel guide body of a panel guide member is cut according to an embodiment, and FIG. 9 is a cross-sectional view of a display device in which a warp preventing member of a panel guide member is cut according to an embodiment.

Referring to FIGS. 1, 8, and 9, an LCD device 400 includes a receiving container 410, a light source 420, a display panel 430, a panel guide member 100, and a top case 450.

The receiving container 410 includes a bottom plate 412 and sidewalls 414. For example, the bottom plate 412 has substantially a plate shape, and has a quadrangular shape when seen from a plane. The sidewalls 414 are formed or disposed at the edges of the bottom plate 412. The sidewalls 414 form a receiving space on the bottom plate 412.

The light source 420 is disposed on the bottom plate 412 of the receiving container 410 to generate light required for displaying an image. In the embodiment, the light source 420 can include a plurality of cold cathode fluorescent lamps (CCFLs) arranged in parallel on the bottom plate 412.

The display panel 430 is received inside the receiving container 410. The display panel 430 may have substantially a rectangular parallelepiped plate shape, and the display panel 430 is disposed substantially in parallel to the bottom plate 412.

The display panel 430 includes a first display substrate 431, a second display substrate 432, an LC layer 430a, a first polarizer 433, and a second polarizer 434.

In the embodiment, the first display substrate 431 includes a plurality of thin film transistors (TFTs) and pixels electrically connected with the TFTs. The second substrate 432 includes color filters corresponding to the pixels. The LC layer 430a is interposed between the first and second display substrates 431 and 432. The first polarizer 433 is attached on the first display substrate 431, and the second polarizer 434 is attached on the second display substrate 432.

The display panel 430 generates a full-color image, for example, using light generated from the light source 420, the LC layer 430a controlling light transmittance, and the color filters.

Meanwhile, an optical unit 435 can be disposed between the light source 420 and the display panel 430 to improve brightness and brightness uniformity of light generated from the light source 420.

The optical unit 435 can include a diffusion plate 436, a plurality of diffusion sheets 437, and a prism sheet 438. The diffusion plate 436 primarily diffuses generated from the light source 420 to improve an optical distribution. The plurality of diffusion sheets 437 disposed on the diffusion plate 436 improve the optical distribution of light that has passed through the diffusion plate 436 even more. The prism sheet 438 disposed on the diffusion sheets 437 changes the direction of the diffused light sufficiently diffused by the diffusion sheets 437 to a direction substantially perpendicular to the display panel 430.

The panel guide member 100 supports the NEDR disposed around the EDR of the display panel 430 having the quadrangular plate shape and displaying an image.

In detail, the panel guide member 100 includes the plurality of panel guide bodies 145 and the plurality of warp preventing members 150.

In the embodiment, the plurality of panel guide bodies 145 divide and support the NEDR of the display panel 430.

The panel guide bodies 145 can include at least two parts. In the embodiment, the panel guide bodies 145 include four parts, for example.

The four panel guide bodies 145 are disposed to four edges of the display panel having the quadrangular shape, respectively. The panel guide bodies 145 have a perpendicularly bent bracket shape, for example, to support the four edges of the display panel 430.

Each panel guide body 145 includes a first support 141 for supporting the display panel 430, a second support 142 for supporting the lateral side of the display panel 430, and a third support 143 for fixing the panel guide body 145 on the bottom plate 412 of the receiving container 410.

The panel guide bodies 145 including the four parts include a synthetic resin. Also, since each panel guide body 145 is manufactured using an injection manner, it expands when heated and contracts when cooled.

Referring to FIGS. 1 and 9, the warp preventing members 150 prevents generation of warp caused by expansion or contraction of the panel guide bodies 145 including the plurality of parts, and mechanically connects the panel guide bodies 145 including the plurality of parts.

In the embodiment, the warp preventing member 150 includes an elastic member including an elastic material to prevent warping of the panel guide bodies 145 and connect the panel guide bodies 145.

The warp preventing member 150 is interposed between the ends of adjacent panel guide bodies 145, and coupled to the panel guide body 145. In the embodiment, an adhesive member can be interposed between the warp preventing member 150 and the panel guide body 145. The adhesive member can be a double-sided adhesive tape or an adhesive. Alternatively, the warp preventing member 150 and the panel guide body 145 can be integrally formed.

The warp preventing member 150 includes a first warp prevention support 151 and a second warp prevention support 153 for fixing the panel guide body 145 to the receiving container. In addition, the warp preventing members 150 can further include a side warp prevention support 152 for supporting the lateral side of the display panel.

The warp preventing members 150 are disposed at ends of the adjacent panel guide bodies, respectively, so that the warp preventing members 150 are fit in each other, or can be coupled to a body interposed between the ends of the adjacent panel guide bodies using a spring.

The top case 450 includes a first cover 454 and a second cover 456. When seen from a plane, the top case 450 has a quadrangular frame shape having an opening therein, and is disposed in parallel to the bottom plate 412. In the embodiment, the second cover 456 is connected to the first cover 454, disposed in parallel to the sidewall 414 of the receiving container 410, and mechanically coupled to the sidewall 414. For example, the second cover 456 can be hook-coupled to the sidewall 414.

As described above, the panel guide bodies separated into a plurality of parts, and an elastic member interposed between the panel guide bodies form the panel guide member to support the display panel. Therefore, warping of the panel guide member is not generated even when the panel guide body expands/contracts, so that reduction in display quality of an image due to light leakage can be prevented.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A panel guide member comprising:
   a plurality of panel guide bodies dividing and supporting a non-effective display region around an effective display region of a display panel on which an image is displayed; and
   warp preventing members connecting the panel guide bodies,
   wherein each of the warp preventing members is disposed between the side of the panel guide bodies, wherein each of the warp preventing members is disposed to the edge of the panel guide bodies.

2. The panel guide member according to claim 1, wherein each of the warp preventing members comprises an elastic member.

3. The panel guide member according to claim 1, wherein each of the warp preventing member comprises first elastic members each having a first coupling portion, and second elastic members each having a second coupling portion, the first elastic members being disposed at ends of the panel guide bodies facing each other, and the second coupling portion being coupled to the first coupling portion.

4. The panel guide member according to claim 3, wherein the first coupling portion comprises a coupling protrusion, and the second coupling portion comprises a coupling groove coupled to the coupling protrusion.

5. The panel guide member according to claim 1, wherein each of the warp preventing member comprises:
 a body between the panel guide bodies;
 a first elastic member between the body and the panel guide body on one side; and
 a second elastic member between the body and the panel guide body on the other side opposite to the one side.

6. The panel guide member according to claim 5, wherein each of the first and second elastic members comprises a spring.

7. A display device comprising:
 a receiving container comprising a bottom plate and sidewalls protruding from edges of the bottom plate;
 a light source in the receiving container, the light source generating light;
 a display panel facing the bottom plate and displaying an image using the light;
 a panel guide member comprising a plurality of panel guide bodies dividing and supporting a non-effective display region around an effective display region of the display panel on which an image is displayed, and warp preventing members connecting the panel guide bodies; and
 a top case comprising a first cover covering an edge of the display panel, and a second cover extending from the first cover along the sidewalls to couple to the sidewalls,
 wherein each of the warp preventing members is disposed between the side of the panel guide bodies.

8. The display device according to claim 7, wherein each of the warp preventing members comprises an elastic member.

9. The display device according to claim 7, wherein each of the warp preventing members comprises first elastic members each having a first coupling portion, and second elastic members each having a second coupling portion, the first elastic members being disposed at ends of the panel guide bodies facing each other, and the second coupling portion being coupled to the first coupling portion.

10. The display device according to claim 9, wherein the first coupling portion comprises a coupling protrusion, and the second coupling portion comprises a coupling groove coupled to the coupling protrusion.

11. The display device according to claim 7, wherein each of the warp preventing members comprises:
 a body between the panel guide bodies;
 a first elastic member between the body and the panel guide body on one side; and
 a second elastic member between the body and the panel guide body on the other side opposite to the one side.

12. The display device according to claim 11, wherein each of the first and second elastic members comprises a spring.

13. The display device according to claim 7, wherein each of the warp preventing members comprises a first warp prevention support for supporting the display panel, and a second warp prevention support for fixing the panel guide body to the receiving container.

* * * * *